Dec. 3, 1968   L. E. UPCHURCH   3,413,962
ROTARY ENGINE

Filed Nov. 17, 1966   7 Sheets-Sheet 2

Inventor:
Lewis E. Upchurch,
by Thomson & Mrosz
Attorneys

Dec. 3, 1968  L. E. UPCHURCH  3,413,962
ROTARY ENGINE
Filed Nov. 17, 1966  7 Sheets-Sheet 3

Inventor:
Lewis E. Upchurch,
by Thomson & Mrose
Attorneys

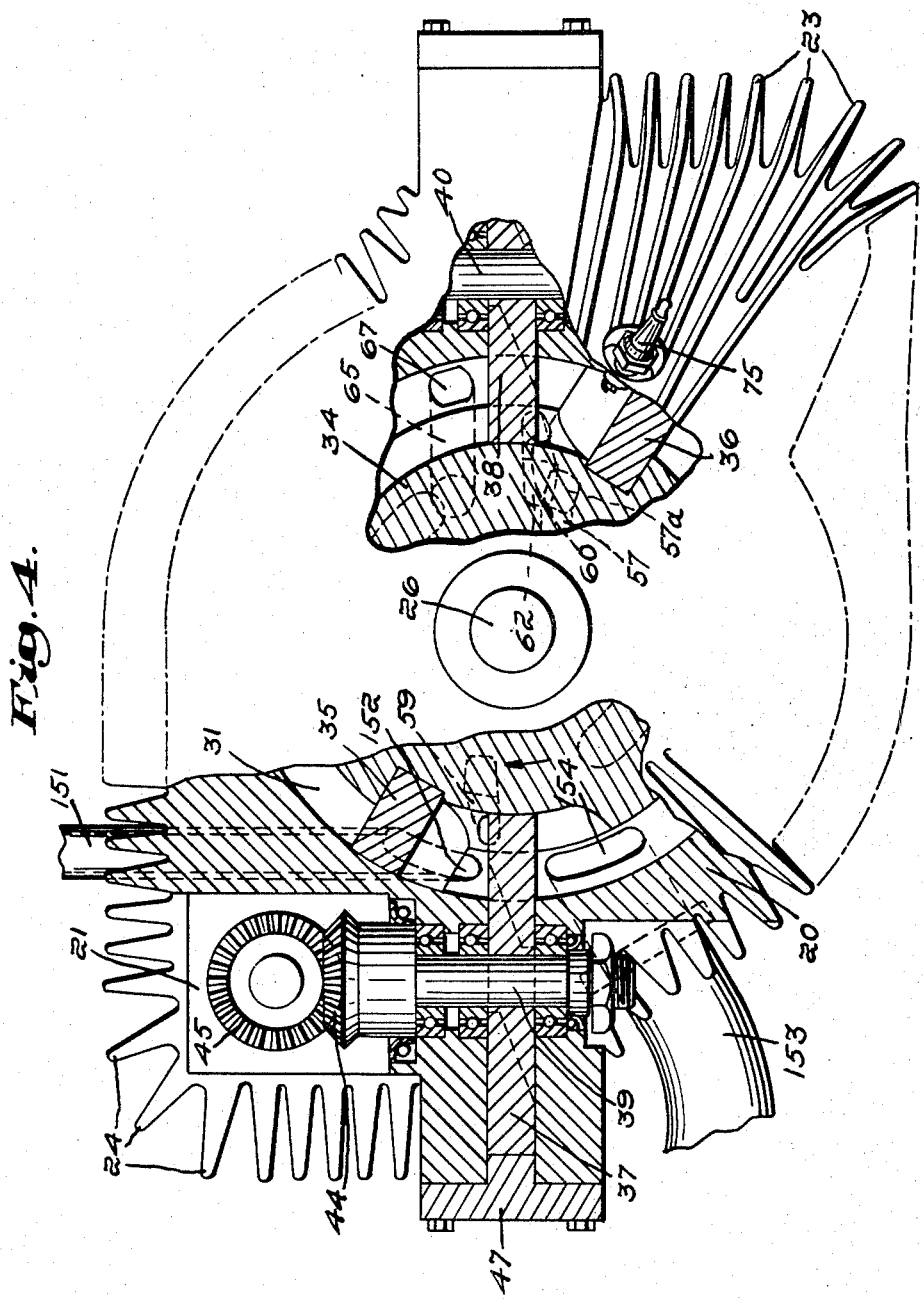

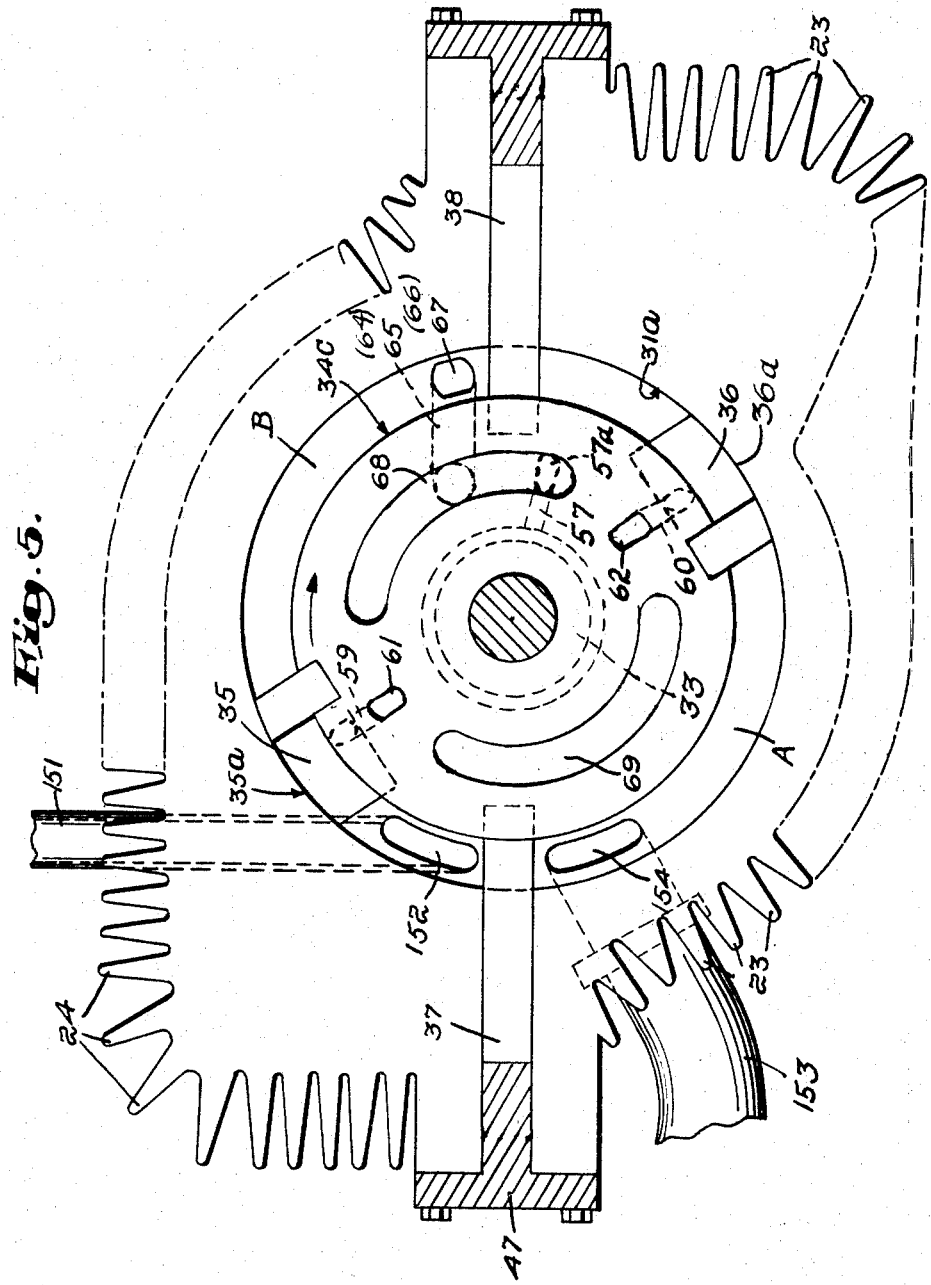

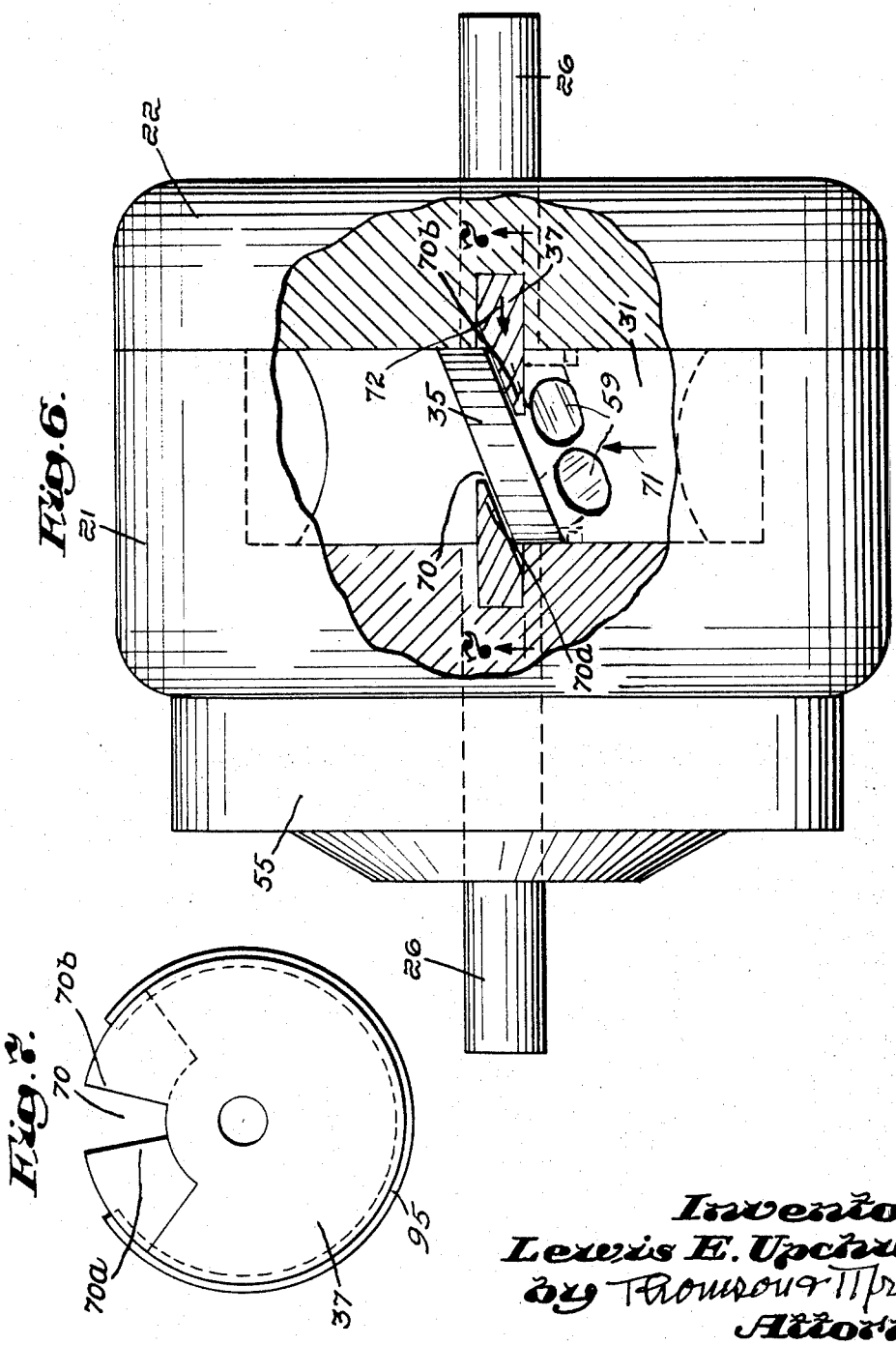

Dec. 3, 1968  L. E. UPCHURCH  3,413,962
ROTARY ENGINE
Filed Nov. 17, 1966  7 Sheets-Sheet 7
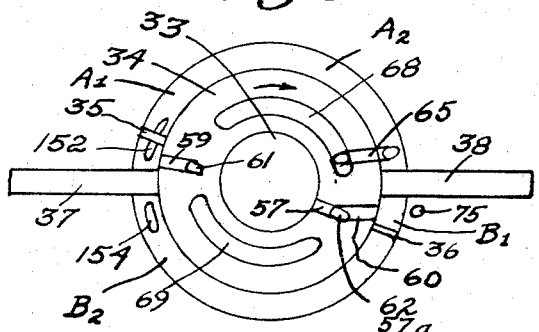
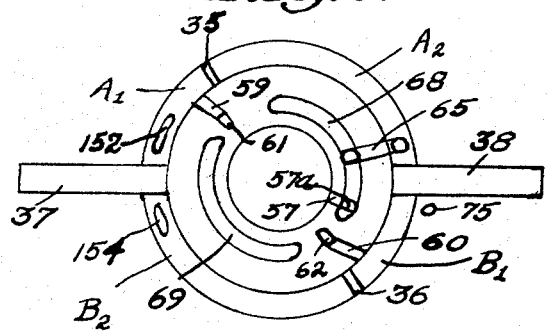
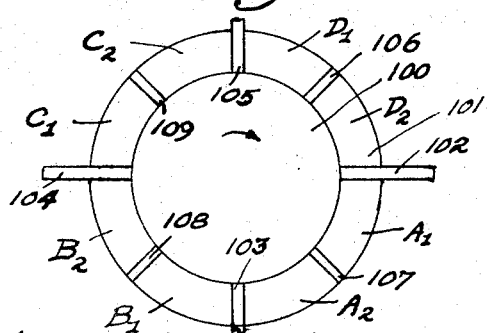
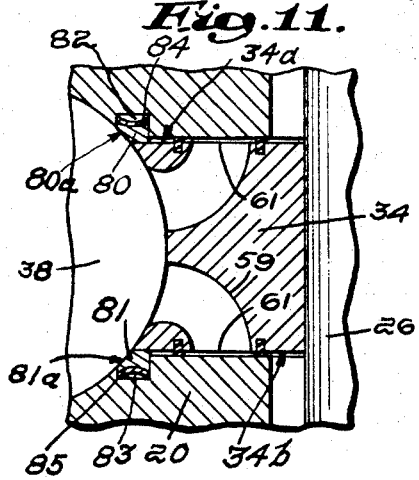
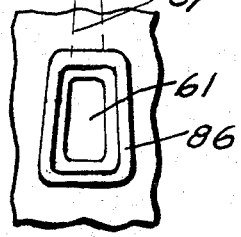
Inventor:
Lewis E. Upchurch,
by Thouron & Prose
Attorneys

United States Patent Office 3,413,962
Patented Dec. 3, 1968

3,413,962
ROTARY ENGINE
Lewis E. Upchurch, 10 Jefferson St.,
Marblehead, Mass. 01945
Filed Nov. 17, 1966, Ser. No. 595,280
10 Claims. (Cl. 123—13)

ABSTRACT OF THE DISCLOSURE

A rotary engine having a casing enclosing a rotor chamber in which a drive rotor is mounted. The rotor has a concave peripheral surface and carries one or more projecting vanes. A pair of disk-shaped gates are mounted on opposite sides of the chamber and rotate about axes perpendicular to that of the rotor. The gates have slots which permit the vanes to pass through. The gates divide the chamber into two regions, in one of which intake and compression occur and in the other of which combustion and exhaust take place. Fuel compressed by a vane as it travels through the first region is led to an accumulator chamber, then transmitted at the appropriate time to the combustion region and ignited there to drive a vane.

---

This invention relates in general to internal combustion engines, and more particularly to engines of the type generally classified as rotary in which the main drive element is rotated directly by combustion of the fuel mixture.

The principal object of this invention is to provide an engine which is highly efficient, compact, and simple in construction and which is capable of higher power output than previous engines of comparable size. Another object is to provide an engine which has a relatively high torque output. Still another object is to provide an engine which has a minimum number of moving parts. Other objects, advantages, and novel features will be apparent from the following description.

The engine consists in general of a housing having a cylindrical rotor chamber in which a rotor, attached to a drive shaft, is mounted, a pair of vanes attached to the rotor at diametrically opposite positions, and a pair of gates mounted on opposite sides of the chamber and continuously rotated in unison with the rotor about axes perpendicular to that of the rotor. The peripheral surface of the rotor is concave in cross section and the gates are disks of the same radius as the concave rotor surface. The vanes extend beyond the curved rotor surface. The gates have slots which are rotated into the paths of the vanes at appropriate times to permit the latter to pass through. Except for the brief period in which the vanes are passing through, the gates divide the rotor chamber into two regions, in one of which intake and compression of the fuel mixture occur and in the other of which combustion and exhaust take place. The vanes in turn, subdivide these regions into intake and compression regions, and combustion and exhaust regions.

The operation of the engine, although purely rotary, is essentially equivalent to that of a four cycle engine. The vane passing through the intake-compression region draws in fuel mixture behind it and simultaneously compresses mixture ahead of it. The engine is provided with an accumulator chamber to which the compressed gas is transferred and temporarily stored. When this vane passes through a gate into the combustion-exhaust region, the compressed gas is released into the combustion region, between the vane and the gate which it has just passed through, and ignited to drive the vane. As the vane moves through the combustion-exhaust region, it sweeps out in front of the spent gas left from a previous combustion.

An engine having two vanes on the rotor and two gates yields two power strokes per revolution. By multiplying the number of vanes and gates, four, six, eight, or any desired multiple of two power strokes per revolution, may be obtained within practical limits.

In the drawings illustrating the invention:

FIG. 4 is a front elevation of the engine, partly in elevation and partly in cross-section along line 4—4 of FIG. 1;

FIG. 5 is a cross-section taken along line 5—5 of FIG. 3, part of the housing being shown in outline;

FIG. 6 is a side view taken partly in cross-section along line 6—6 of FIG. 3, illustrating one of the vanes passing through a gate;

FIG. 7 is a detail view of one of the gates;

FIGS. 8, 9 are schematic views illustrating the rotor position at various points in the cycle of the engine;

FIG. 10 is a schematic illustration of the vane and gate layout for an engine having four power strokes per revolution, operating according to the principle of the invention;

FIG. 11 is an enlarged fragmentary cross-section, taken in the region of one of the gates, illustrating the sealing arrangement around the rim of the rotor and the charging ports;

FIG. 12 is a fragmentary end view of the rotor in the region of one of the charging ports;

FIG. 13 is an enlarged fragmentary view showing the seals for one of the vanes; and FIG. 14 is a fragmentary cross-section taken along line 14—14 of FIG. 13.

Figure 3:
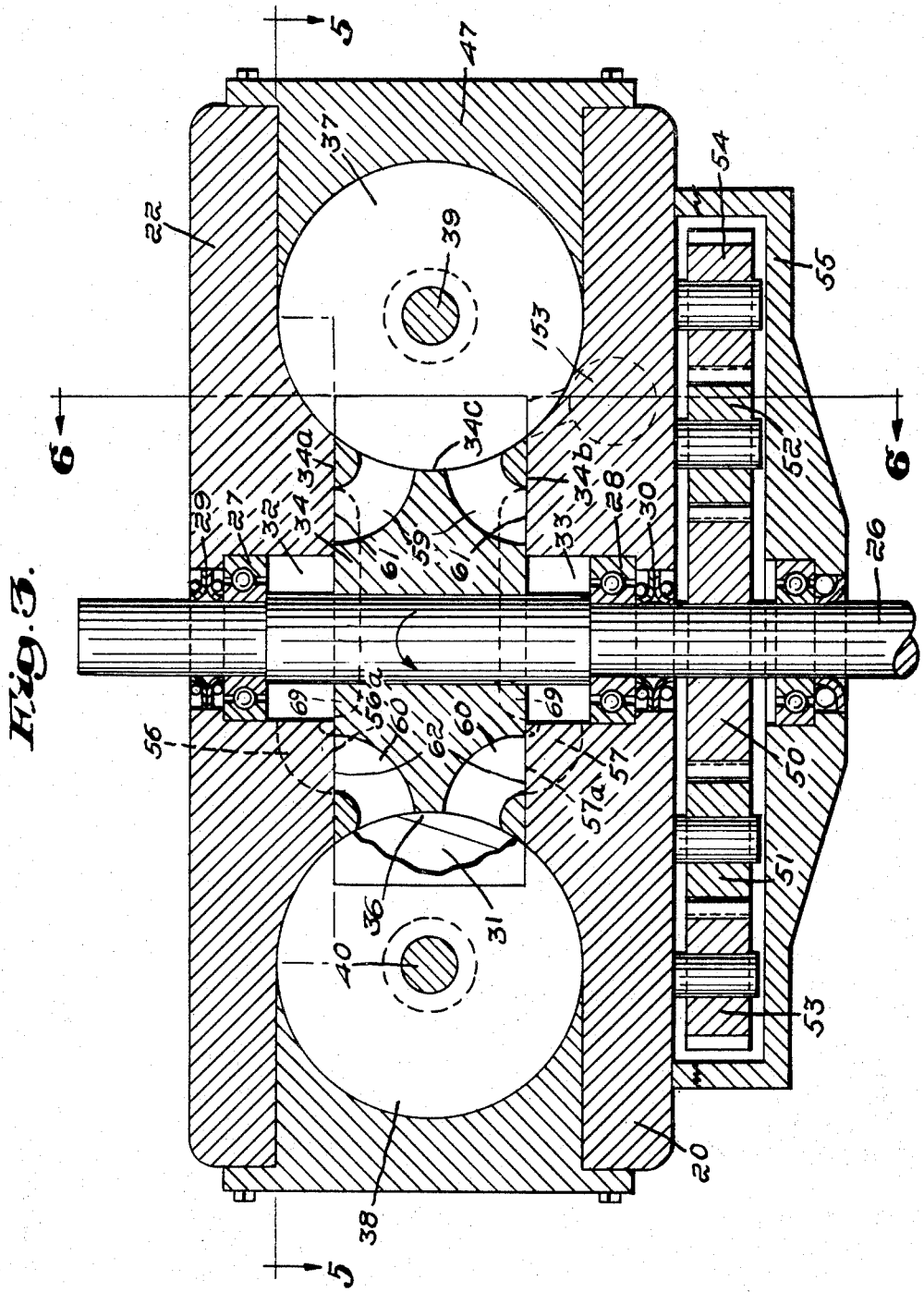
FIG. 3 is a cross-section, partly broken away, taken along line 3—3 of FIG. 2, the portion forward of the gear cover being shown in section along the center line of the rotor.

The housing of the engine consists of a lower block 20, an upper block 21, and a front cover 22, all made of material ordinarily used for engine blocks, such as cast iron or aluminum. The blocks are provided with integrally formed cooling fins 23, 24 and 25. A drive shaft 26 extends through the housing and is mounted in bearings 27 and 28, as best shown in FIG. 3. Seals 29 and 30 are provided around the shaft next to the bearings. The engine is normally mounted with the drive shaft horizontal, but can be used in a vertical or oblique position.

Within the housing, as best seen in FIG. 3, are a cylindrical rotor chamber 31 and two cylindrical chambers, referred to as accumulator chambers, 32 and 33 of somewhat smaller diameter. Bearings 27 and 28 form the end walls of chambers 32 and 33, and the drive shaft passes through all three chambers. A rotor 34 is mounted on shaft 26 and disposed in chamber 31. The rotor has flat end surfaces 34a and 34b which are sealed against the adjacent walls of chamber 31. The peripheral surface 34c of the rotor is concave in cross section. The rotor is fixed to the shaft and is the main driving element of the engine.

Attached to rotor 34 is a pair of vanes 35 and 36, disposed diametrically opposite each other and obliquely with respect to the axis of shaft 26, as best seen in FIGS. 4 and 5. These vanes have outer surfaces 35a and 36a shaped to fit to the contour of the side wall 31a of chamber 31.

Figure 1:
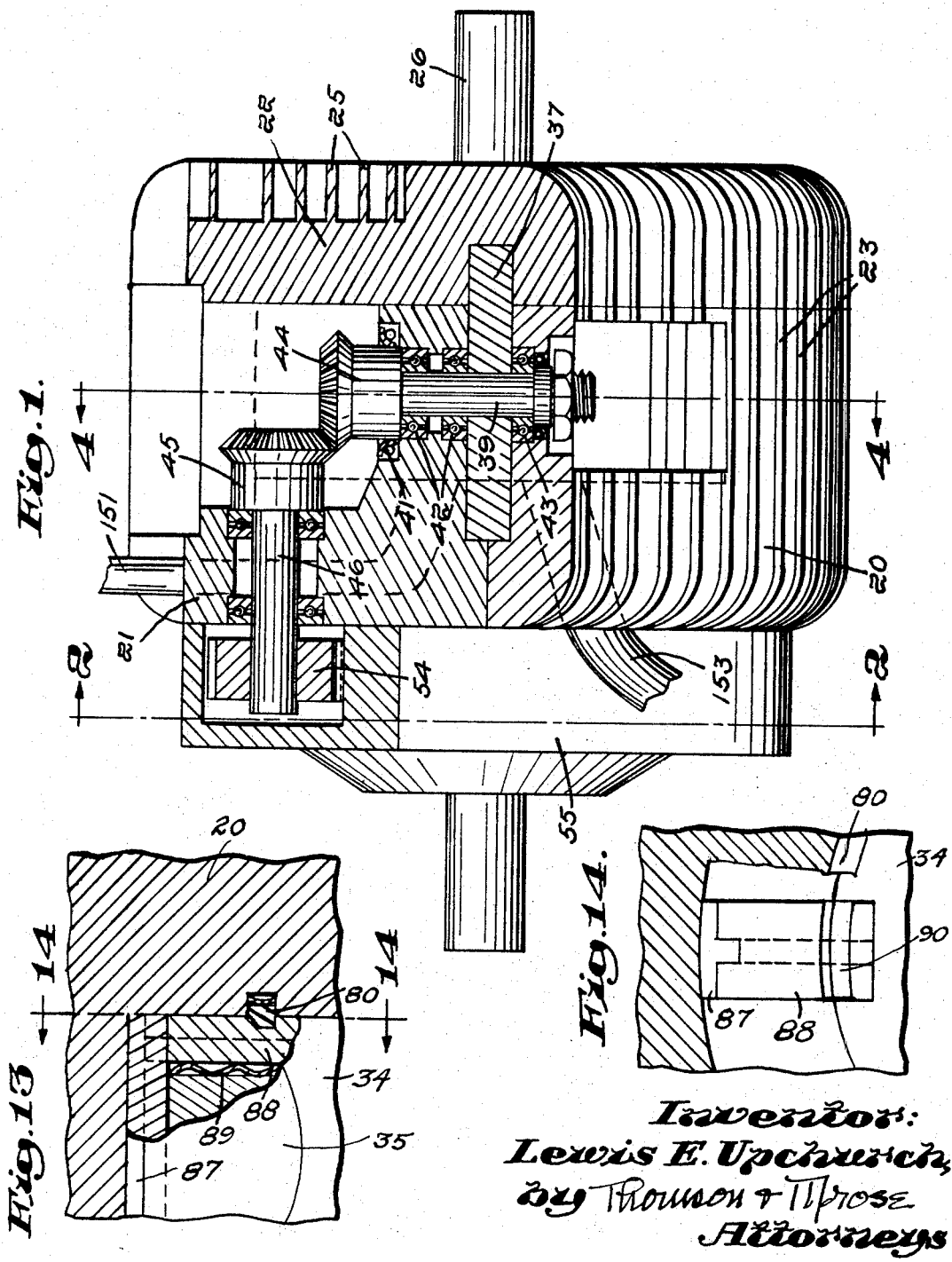
FIG. 1 is a side elevation, taken partly in cross-section in the region of the nearest gate and its drive gear, of a rotary engine constructed according to the invention.

Disposed on opposite sides of the rotor 34, and parallel to its axis, are two generally disk shaped gates 37 and 38, which are fixed on shafts 39 and 40, which are mounted at right angles to shaft 26. The mounting of shaft 39 is illustrated in FIGS. 1 and 3. The shaft is mounted in bearings 42 and 43 supported in blocks 20 and 21 and sealed by a seal 41. A bevel gear 44 is carried on the upper end of shaft 39 and meshes with a bevel gear 45 mounted on a horizontal shaft 46 which extends to the rear of the housing. An end cap 47, curved to conform to the radius of gate 37 is bolted to the housing and encloses the gate. Gate 38 is similarly mounted.

Figure 2:
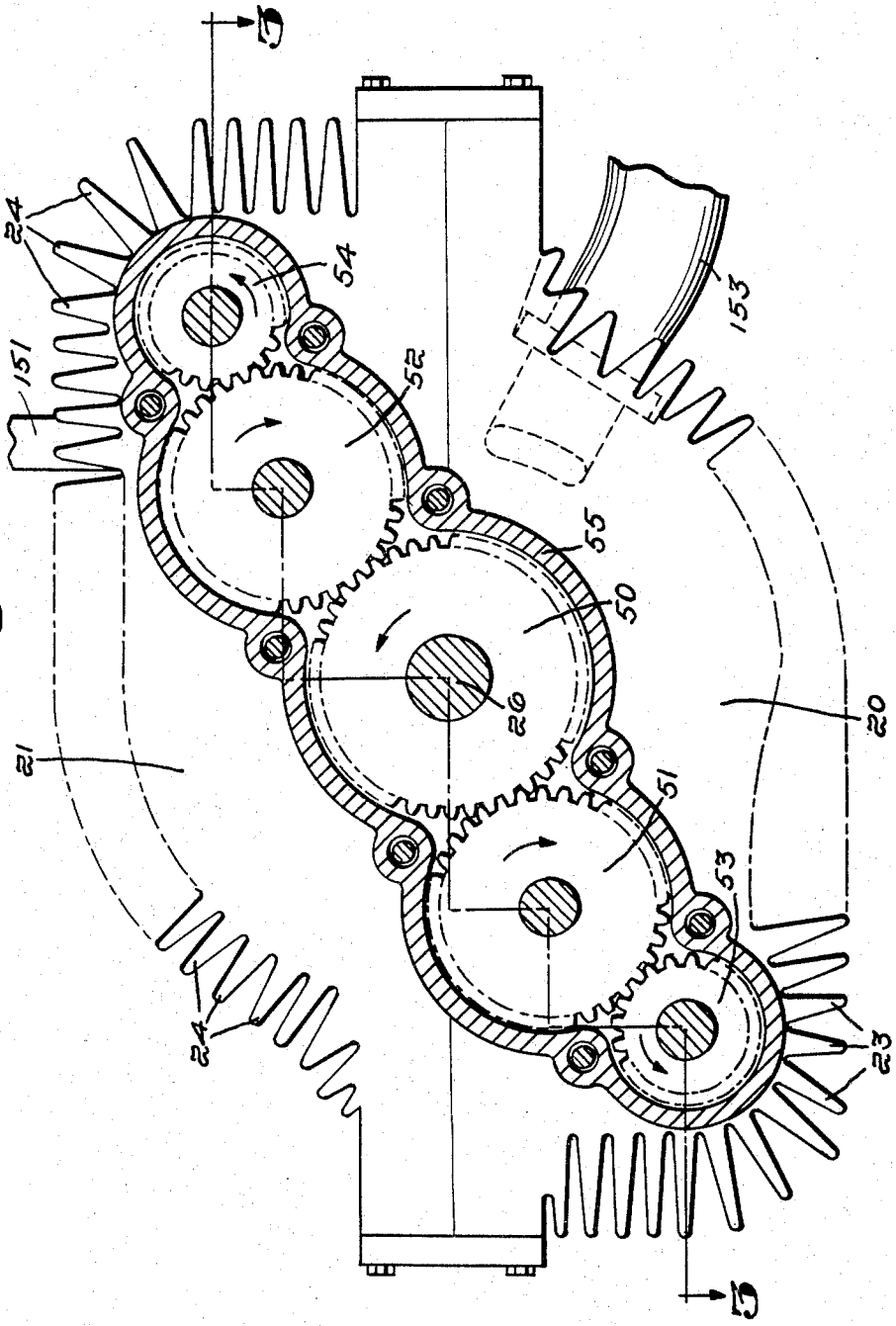
FIG. 2 is a cross-section taken along line 2—2 of FIG. 1, part of the housing being shown in outline.

The gear train for driving the gates 37 and 38 in synchronization with the rotor is illustrated in FIG. 2. A gear 50 is mounted on the main drive shaft 26 and engages gears 51, 52, which in turn engage gears 53 and 54, respectively. As shown in FIG. 1, gear 54 drives shaft 39 of gate 37 through the bevel gears 44, 45. Gear 53 drives shaft 40 of gate 38 through a similar pair of bevel gears (not shown) mounted in the lower corner of housing section 20. Gears 50–54 are all enclosed in a gear cover 55.

An intake manifold 151 leads to a port 152 in the wall of chamber 31. A mixture of air and vaporized gasoline or other fuel is fed to the chamber through the intake manifold from any suitable mixing device such as a carburetor (not shown). An exhaust manifold 153 leads to an exhaust port 54 in the wall of chamber 31. The intake port and exhaust port are disposed close to, and on opposite sides of, gate 37. With respect to the direction of rotation of the rotor, the intake port is forward of gate 37 and the exhaust port behind the gate.

The chambers 32 and 33, best seen in FIG. 3, are referred to as accumulator chambers. A passage 56 leads from chamber 32 to a port 56a in the wall of chamber 31 adjacent one end face 34a of the rotor. A similar passage 57 leads from chamber 33 to a port 57a adjacent the other end face 34b of the rotor. Directly behind each of the vanes is a pair of passages 59, and 60, in the rotor which are referred to as charging passages. These passages, at certain positions of the rotor, are aligned with passages 56 and 57, to permit compressed gas from the accumulator chambers 32 and 33 to enter chamber 31, as will be later explained, and have ports 61 and 62 of the same contour as ports 56a, and 57a.

Leading from chamber 31, to the rear of gate 38, are passages 64 and 65, disposed in blocks 22 and 21. These passages have ports 66 and 67 disposed against end faces 34a and 34b of the rotor. The rotor has arcuate grooves 68 and 69 in both end faces which, at certain positions of the rotor, line up with ports 66 and 67 and connect passages 64 and 65 to the ports 56a and 57a of passages 56 and 57 leading to the accumulator chambers 32 and 33.

The gates 37 and 38 divide the chamber 31 into two semicircular regions A and B, referred to as the intake-compression and combustion-exhaust regions. The gates are provided with slots through which the vanes 35 and 36 can pass.

A typical arrangement of the slots is shown in FIGS. 6 and 7. The gate 37 has a slot 70. In order to minimize leakage between chamber regions A and B, the slots and the vanes are both disposed obliquely. Gate 37, for example, has an oblique slot 70. Vane 35 is being moved by the rotor in the direction of arrow 71. Simultaneously the gate is being rotated in the direction of arrow 72. As vane 35 approaches the gate the left end 70a (in FIG. 6) of the slot is just emerging into chamber 31. The right hand end of vane 35 enters the slot. As both rotor and gate rotate further, the slot is moved to the left along the vane until the left hand end of the vane emerges from the right hand end 70b of the slot. The movement of the vane and gate are synchronized through the direct gear drive from the rotor to the gate.

Ignition for the engine is provided by a spark plug 75, which is fired in synchronization with the movement of the rotor by any suitable ignition system (not shown). It is understood that the engine may also be equipped with a customary type of starter and means for controlling speed by controlling the flow of fuel mixture, and the drive shaft 26 may be connected to a customary transmission.

The engine as here illustrated has two power strokes per revolution of the rotor. The operation for each power stroke includes four stages equivalent to those of a four cycle reciprocating engine, intake, compression, combustion, and exhaust. The operation is best understood with reference to FIGS. 8 and 9. The rotor 34 is rotating in the clockwise direction. In FIG. 8 vane 36 has just passed through gate 38 and likewise vane 35 has passed through gate 37. Both gates are closed. Port 62 of passage 60 in the rotor is aligned with port 57a of passage 57 in the housing so that the compressed mixture flows from the accumulator chamber 33 into region $B_1$ the part of region B between vane 36 and gate 38.

In FIG. 9 port 62 has moved beyond port 57a so that region $B_1$ is shut off from the accumulator chamber. At this point, plug 75 is fired and the resulting combustion drives vane 36 clockwise. Simultaneously spent gases in region $B_2$, between vane 36 and gate 37 are being driven out through exhaust port 154, a new charge of mixture is being drawn through intake port 152 into region $A_1$ between vane 35 and gate 37, and gas in region $A_2$ between vane 35 and gate 38 is being compressed.

As soon as the forward end of one of the grooves 68 reaches port 57a, passage 57 is connected with passage 65, and compressed gas from region $A_2$ flows into the accumulator chamber. This flow continues until the rear end of the groove 68 passes beyond passage 65. Flow is then cut off. When vane 35 has passed through gate 38, port 61 of passage 59 is aligned with port 57a of passage 57 allowing a charge of compressed gas to enter behind vane 35. The spark plug 75 is again fired, after port 61 has passed port 57a, igniting the charge of compressed gas behind vane 35 and driving it clockwise. Vane 35 sweeps out the spent gas left in region $B_2$ from the previous combustion, and simulatneously vane 36, which is now passing through region A, draws in mixture through port 152 and compresses the mixture in region $A_2$. When one of the grooves 69 bridges passages 65 and 57, compressed gas flows from region $A_2$ into accumulator chamber 33. The operation has been described with respect to only one of the accumulator chambers 32 and 33, but it is understood the compressed gas is transferred from region $A_2$ to both chambers simultaneously, and from both to the region $B_1$ at the appropriate time for charging the combustion region, through the corresponding passages in the rotor and the front cover 22.

FIGS. 11, 13 and 14, illustrate the manner in which the end surfaces of the rotor 34 are sealed against the adjoining walls of the rotor chamber. Sealing rings 80 and 81, made of suitable heat resistant matrial, are disposed in grooves 82 and 83, and backed up by bowed metal springs 84 and 85. Rings 80 and 81 bear on the outer margins of the end surfaces 34a and 34b of the rotor and prevent leakage between the space around the rotor in chamber 31 and the chambers 32 and 33. As shown in FIG. 11, the rings 80 and 81 project beyond the rotor and have surfaces 80a and 81a, engaging and conforming to the peripheral surfaces of the gates, for example, gate 38.

Ports 61 of the charging passages 59 are also sealed by rings 86, set in grooves in the rotor and bearing on the adjacent walls of the rotor chamber. The shape of these ports and the surrounding seals is shown in FIG. 12 which is somewhat enlarged for clarity. The sides of the ports are disposed on radii 87 of the rotor. The corresponding ports 62 of the charging passages 60 are similarly shaped and sealed. Leakage through these passages to the accumulator chambers from the area surrounding the rotor, particularly the combustion region, is thus prevented. Communication between the accumulator chambers and the combustion region is established only during the time one of the sets of charging ports is aligned with ports 56a and 57a. At this point in the cycle, the vane which is ahead of that set of charging passages, shuts off the combustion region from any gases which may still be burning in the exhaust region as the result of the previous combustion.

Ports 56a and 57a are of the same shape as ports 61 and 62. The radially disposed sides of the ports insure quick transition from fully closed to fully open, and again to fully closed condition of the charging passages. The combustion region is thus charged quickly, and ignition may take place as soon as the seals around the ports of the charging passages have passed ports 56a and 57a.

Vanes 35 and 36 are also sealed against the walls of the rotor chamber. For example, as shown in FIGS. 13 and 14, the outer end of vane 35 is grooved to receive a T-shaped seal member 87, and the side edge of the vane is grooved to receive a T-shaped seal member 88 which is notched at its outer end to receive member 87. Member 88 is backed up by a corrugated spring 89. Member 87 is pressed against the walls of the rotor chamber by centrifugal force. Member 88 has a groove 90 through which seal ring 80 passes.

The gates are also provided with seals which engage the concave surface of the rotor. For example, as shown in FIG. 7, gate 37 has a seal ring 95 set in a groove in its periphery and extending to the ends of slots 70. At the time when the slots in the gates are turned toward the rotor, the vanes are passing through the gates and shut off region A from region B. It is understood that the projection of the various seals here described is exaggerated in the drawings for clarity. The actual projection can be in the order of a few thousandths of an inch.

The general arrangement for an engine operating on the principle here described having four power strokes per revolution is illustrated schematically in FIG. 10. A rotor 100 is disposed in a rotor chamber 101. Four gates 102, 103, 104, and 105 divide the space around the rotor into four regions. The rotor carries four vanes 106, 107, 108, 109 which, when moving between gates, subdivide the regions into intake, compression, combustion, and exhaust regions. For example, assuming the rotor is rotating clockwise, in the lower half of the chamber 101 intake occurs in region $A_1$, compression in $A_2$, combustion in $B_1$, and exhaust in $B_2$. Simultaneously in the upper half, intake occurs in region $C_1$, compression in $C_2$, combustion in $D_1$ and exhaust in $D_2$. It is understood that suitable passages are provided to transmit compressed gas from regions $A_2$ and $C_2$ to one or more accumulator chambers, and to charge regions $B_1$ and $D_1$ at appropriate times in the cycle. Considered in terms of timing of the combustion explosions, four power strokes will occur during a complete revolution of the rotor. In terms of power output, however, an engine with this arrangement will yield the equivalent of eight power strokes per revolution, because combustion takes place in regions $B_1$ and $D_1$ behind two oppositely disposed vanes simultaneously. Various numbers of power strokes per revolution may be obtained by suitable arrangement of vanes and gates. It is evident that by omitting one vane in the two stroke engine, it can be made to operate as a single stroke engine. However, maximum efficiency and power capacity is generally obtained by designing the engine for multiples of two power strokes per revolution.

The movement of all parts of the engine here described is purely rotary, and the engine is therefore basically capable of higher speed and power losses are intrinsically lower than in the case of a reciprocating engine. The driving elements have no dead center position, and all the force produced by combustion is utilized for driving. The torque factor remains constant as the net combustion force is always applied at a fixed distance from the rotor.

The gates are positively driven in unison with the rotor, so that synchronization of movement of the vanes and the gates is simple to achieve and remains accurate. The engine requires no valves and associated valve timing mechanisms, as the passages in the rotor and housing essentially perform this function. The engine has relatively few moving parts, is extremely simple and compact, and requires a minimum of maintenance.

What is claimed is:

1. A rotary engine comprising a housing having an inner side wall and end walls defining a rotor chamber, a rotor mounted in said chamber and having a peripheral surface defining, with said side wall, a space around said rotor, a vane attached to said rotor and extending into said space, a pair of gates disposed in spaced positions around said rotor, said gates extending into said space and defining a first and a second region traversable by said vane, said gates having openings through which said vane may pass and being rotatable to carry said openings into and out of said space, an intake port for admitting fuel to said first region, said vane when traversing said first region acting to compress said fuel, an accumulator chamber isolated from said space, means for connecting said accumulator chamber to said first region as said vane is traversing said first region, means for connecting said accumulator chamber to said second region behind the vane, for a brief interval after said vane enters said second region, means operative after said interval to isolate said accumulator chamber from said second region, and ignition means disposed in said second region and operative to ignite the fuel therein after said accumulator chamber is isolated from said second region.

2. A rotary engine as described in claim 1, having means driven by said rotor for driving said gates to bring said openings into register with said vane as it passes the positions of said gates.

3. A rotary engine as described in claim 1, said rotor having an axis of rotation and said peripheral surface being of the form of a concave surface of revolution about said axis, said gates being circular and slidably engaging said surface and being rotatable about axes perpendicular to that of said rotor.

4. A rotary engine as described in claim 1, said rotor having an axis of rotation and said peripheral surface being of the form of a concave surface of revolution about said axis, said gates being circular and slidably engaging said surface and being rotatable about axes perpendicular to that of said rotor, said vanes being disposed obliquely with respect to said rotor axis and said openings being disposed obliquely with respect to said gates.

5. A rotary engine as described in claim 1, the means for connecting said accumulator chamber to said first region and to said second region comprising passages in said housing and rotor.

6. A rotary engine as described in claim 1 said rotor having end faces disposed against said end walls, said housing having a first passage leading from said first region to one of said end walls and a second passage leading from said accumulator chamber to the same end wall, said rotor having a groove disposed in the end face nearest the end wall to which said passages lead and bridging said passages when said vane is traversing said first region, said passages and groove constituting the means for connecting said accumulator chamber to said first region, and said rotor having a charging passage leading to said peripheral surface behind said vane and registering with said second housing passage during said interval only, said charging passage constituting the means for connecting said accumulator chamber to said second region.

7. A rotary engine comprising a housing having a cylindrical inner side wall and flat end walls defining a rotor chamber, a motor mounted in said chamber, and having a peripheral surface defining, with said side wall, a space around said rotor, said rotor also having flat end surfaces disposed against said end walls, a vane attached to said rotor and extending into said space and slidably engaging said side wall, a pair of gates disposed in spaced positions around said rotor, said gates extending into said space and slidably engaging said peripheral surface and defining a first and a second region traversable by said vane, said gates having openings through which said vane may pass and being rotatable to carry said openings into and out of said space, and intake port for admitting fuel to said first region, said vane when traversing the first region acting to compress said fuel, an accumulator chamber to said first region as said vane is traversing said first region, means for connecting said accumulator chamber to said second region behind the vane for a brief interval after said vane enters said second region, means operative after said interval to isolate said accumulator chamber from said second region, and ignition means disposed in said second region and operative to ignite fuel therein after said accumulator chamber is isolated from said second region means for transmitting the compressed fuel to said second region as said vane is traversing said second region, and means for igniting the fuel in said second region to drive said vane and rotor.

8. A rotary engine as described in claim 7, said gates having sealing elements engaging said peripheral surface, and said vane having a sealing member engaging said side wall.

9. A rotary engine as described in claim 7, said rotor having a charging passage with a port in one of said end surfaces, a sealing member surrounding said charging port and slidably engaging the adjacent end wall and serving as said means for isolating said accumulator chamber from said second region, said housing having a passage from said accumulator chamber with a port in said adjacent end wall, said ports being in register during said interval only, and said passages constituting said means for connecting said accumulator chamber to said second region.

10. A rotary engine is described in claim 7, having circular gaskets in said walls engaging the peripheries of said end surfaces.

References Cited
UNITED STATES PATENTS

| | | |
|---|---|---|
| 1,797,127 | 3/1931 | Brown. |
| 2,779,318 | 1/1957 | Strader. |
| 3,205,873 | 9/1965 | Renshaw. |

RALPH D. BLAKESLEE, *Primary Examiner.*